Patented Nov. 4, 1952

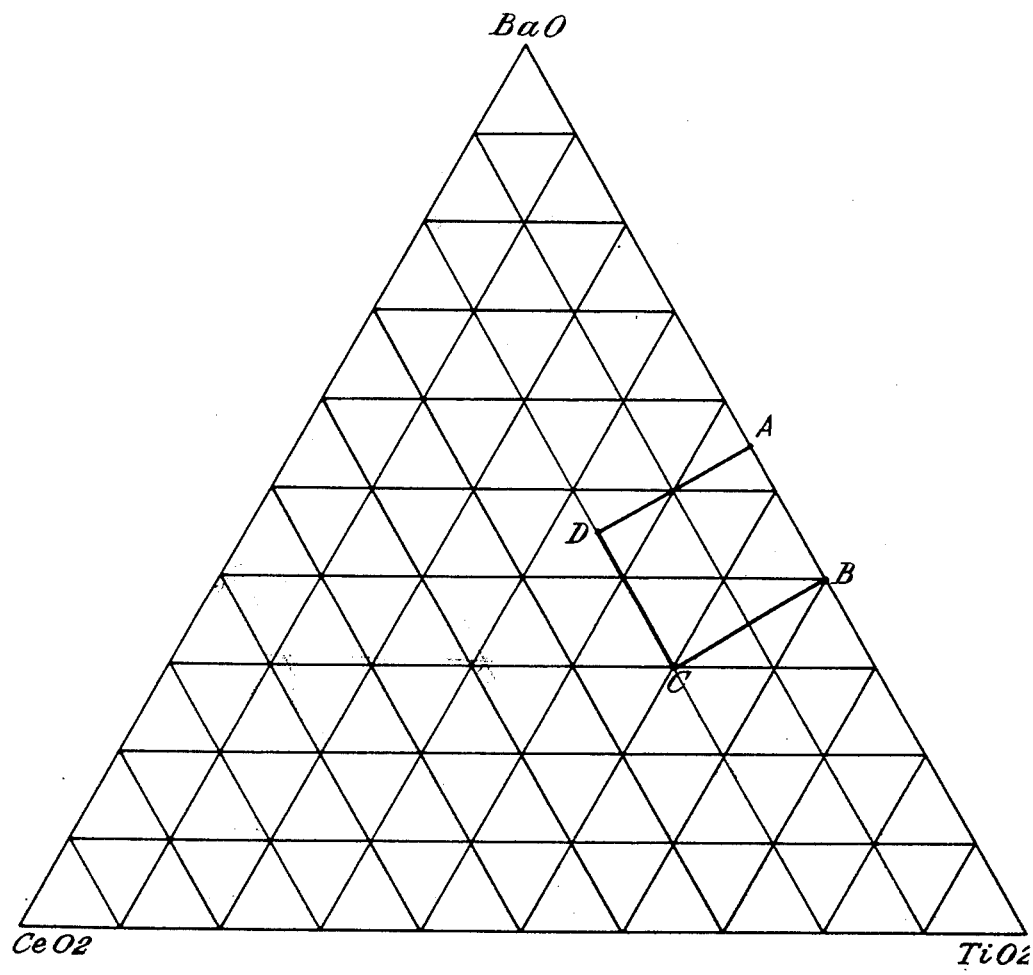

2,616,813

UNITED STATES PATENT OFFICE 2,616,813

CONDENSER

Hendrik Anne Klasens, London, England, assignor to Hartford National Bank and Trust Company, Hartford, Conn., as trustee Application October 29, 1949, Serial No. 124,348
In Great Britain November 10, 1948

7 Claims. (Cl. 106—39)

This invention relates to electrical condensers and more particularly to electrical condensers of the type in which a ceramic material is employed as the dielectric. Titanate materials, which are chemical combinations of titanium dioxide with divalent metal oxides, have valuable dielectric properties. Among such useful titanates is barium titanate. At radio frequencies barium titanate has a dielectric constant of 1200–1300 at room temperature. At temperatures above 100° there is a sudden rise in the permittivity to a maximum value at about 120° C. It is known that this peak in the permittivity can be shifted towards room temperatures by partial replacement of barium by strontium and in this way a condenser can be made having a high dielectric constant at room temperature. However, the peak is sharp so that small changes in temperature cause large changes in the capacity.

The purpose of the present invention is to provide materials of the barium titanate type in which the peak in permittivity not only is at temperatures near room temperature but also is broadened. Such materials not only have very high values of the permittivity at room temperature but also are little affected by small changes of the temperature.

According to the present invention, in an electrical condenser comprising a solid dielectric and condenser electrodes applied thereto, the dielectric consists of a fired ceramic material having a composition corresponding to that resulting from firing together a mixture of barium oxide, titanium dioxide and cerium dioxide. Preferably the barium oxide lies within the range 41 to 50 mol. percent, the titanium dioxide within the range 35 to 53 mol. percent and the cerium dioxide within the range 3 to 21 mol. percent. In particular, in order to produce ceramic dielectric materials of permittivity greater than 1500, the amount of cerium dioxide does not exceed 20 mol. percent and the amount of barium oxide lies between 40 and 55% for small percentages of cerium dioxide, between 30 and 45 mol. percent for 20 mol. percent of cerium dioxide, and between values obtained by linear interpolation for intermediate percentages of cerium dioxide. In other words, the composition should fall within the area of the quadrilateral ABCD on the ternary diagram shown in the accompanying drawing. Examples of these compositions with the dielectric properties are shown in the appended tables, in which Table I gives the dielectric constant for typical compositions, and Table II gives the variation with temperature of the dielectric constant for three of the compositions of Table I.

Table I

| No. | BaO | TiO$_2$ | CeO$_2$ | Dielectric Constant at 20° C. and 1.7 megacycle |
|---|---|---|---|---|
| 1 | 47 | 50 | 3 | 7,800 |
| 2 | 47 | 48 | 5 | 3,100 |
| 3 | 44 | 53 | 3 | 3,500 |
| 4 | 44 | 47 | 9 | 5,100 |
| 5 | 41 | 44 | 15 | 4,000 |
| 6 | 41 | 38 | 21 | 3,700 |
| 7 | 47 | 35 | 18 | 2,100 |
| 8 | 50 | 47 | 3 | 1,970 |

Table II

| Temperature | No. 1 | No. 2 | No. 3 |
|---|---|---|---|
| 0 | 6,900 | 2,300 | 2,700 |
| 10 | 7,600 | 2,700 | 3,100 |
| 20 | 7,800 | 3,100 | 3,500 |
| 30 | 7,300 | 3,400 | 3,500 |
| 40 | 6,000 | 3,300 | 3,200 |
| 50 | 4,800 | 3,100 | 2,900 |

In carrying out the invention the oxides of titanium and cerium, or any compounds of these elements which decompose on firing to give the said oxides, are mixed, by any of the methods known to the ceramic art, with barium carbonate or any compound giving barium oxide on firing. The mixing is preferably carried out by milling with a ceramic flux, such as bentonite, the amount of flux preferably being less than 10% by weight of the total weight of the oxides, and, after the inclusion of a temporary binder (if desired), the mixture is shaped by any of the processes known to the ceramic art such as extrusion or pressing. The shaped material is then fired at a temperature between 900° and 1500° C. in oxygen. After firing the ceramic dielectric is provided with electrodes, e. g. of silver, in conventional manner to form the condenser.

What I claim is:

1. A capacitor dielectric consisting of a fired reaction product of barium oxide, cerium dioxide and titanium dioxide in the proportions defined wholly within the quadri-lateral ABCD in the accompanying drawing.

2. A capacitor dielectric consisting of a fired reaction product of about 41 to 50 mol. percent BaO; about 35 to 53 mol. percent of TiO$_2$; and about 3 to 21 mol. percent of CeO$_2$.

3. A capacitor dielectric consisting of a fired reaction product of about 3 to 20 mol. percent of CeO$_2$; about 40 to 55 mol. percent of BaO when the proportion of CeO$_2$ is about 3 mol. percent; and about 30 to 45 mol. percent of BaO when the proportion of CeO$_2$ is about 20 mol. percent; and between values obtained by linear interpolation for intermediate percentages of CeO$_2$; and the balance TiO$_2$.

4. A capacitor dielectric consisting of a fired reaction product of about 47 mol. percent of BaO; about 3 to 18 mol. percent of CeO$_2$; and about 35 to 50 mol. percent of TiO$_2$.

5. A capacitor dielectric consisting of a fired reaction product of about 44 mol. percent of BaO; about 47 to 53 mol. percent of TiO$_2$; and about 3 to 9 mol. percent of CeO$_2$.

6. A capacitor dielectric consisting of a fired reaction product of about 41 mol. percent of BaO; about 38 to 44 mol. percent of TiO$_2$; and about 15 to 21 mol. percent of CeO$_2$.

7. A method of manufacturing a capacitor dielectric comprising the steps of mixing about 41 to 50 mol. percent of BaO; about 35 to 53 mol. percent of TiO$_2$, and about 3 to 21 mol. percent of CeO$_2$, and firing the mixture to a temperature of about 900° to 1500° C. in an oxygen atmosphere to produce the dielectric material.

HENDRIK ANNE KLASENS.

REFERENCES CITED

The following references are of record in the file of this patent:

UNITED STATES PATENTS

| Number | Name | Date |
|---|---|---|
| 2,071,452 | Bloch | Feb. 23, 1937 |
| 2,398,088 | Ehlers | Apr. 9, 1946 |

FOREIGN PATENTS

| Number | Country | Date |
|---|---|---|
| 445,269 | Great Britain | 1936 |
| 613,612 | Great Britain | 1948 |